United States Patent Office 3,846,201
Patented Nov. 5, 1974

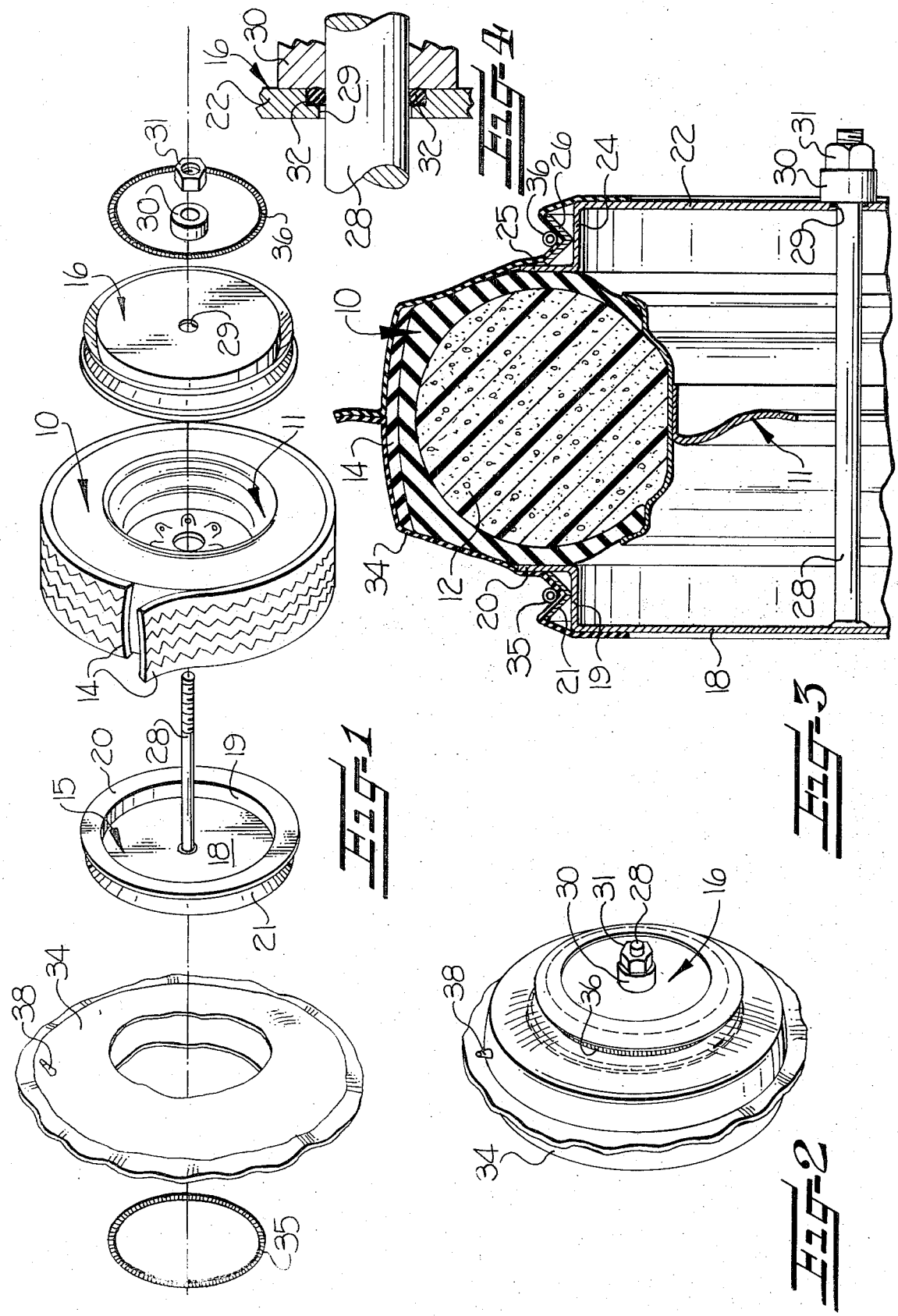

3,846,201
ASSEMBLY AND METHOD FOR BONDING
TREAD MATERIAL TO A TIRE BODY
Homer L. Huskins, Salisbury, N.C., assignor to Brad
Ragan, Inc., Spruce Pine, N.C.
Filed Nov. 2, 1972, Ser. No. 303,228
Int. Cl. B29h 5/04, 11/00, 17/36
U.S. Cl. 156—96
11 Claims

ABSTRACT OF THE DISCLOSURE

Previously cured elastomeric tread material is bonded to the tread face of a permanently mounted, previously cured, solid elastomeric tire body through the use of a method and assembly in which sealing discs and an envelope cooperate in accommodating a fluid pressure differential across the envelope which retains the tire body and tread material in assembled relation.

---

Methods and apparatus for retreading or renewing elastomeric tires by bonding a strip of previously cured tread material to the tire have been coming into wider acceptance and use. Conventionally, prior practices involve the retreading or renewal of pneumatic tire carcasses and employ some restraining means such as an encircling envelope or restraining band to retain a previously cured tire body and the previously cured tread material in assembled relation during curing of an interposed strip of uncured rubber. Tires renewed by such processes and through the use of such assemblies (known as "cold caps") have been found to have significantly improved performance as compared to tires retreaded or renewed in accordance with prior practices using heated molds (known as "hot caps").

However, difficulties have been encountered in attempting to successfully apply cold cap techniques to solid tires. These difficulties, arising from inability to sufficiently tighten a restraining band around an assembled tire body and tread material or to practically seal an envelope to such an assembly, have limited the principal use of cold cap techniques pneumatic tire carcasses and have become of increasing significance with increasing use of solid tires. In particular, tire users whose operations are heavily dependent upon substantially continuous operation of equipment, such as mine operators, have come to adopt tires which are solid in the sense that a tire carcass designed for pneumatic tire operation is filled with an elastomeric material. Such tires, as adopted for use in the mining industry and the like, are produced by filling the cavity of a pneumatic carcass with a foamable elastomeric material, assembling the tire with a wheel, and curing the foamable material while bonding the wheel and tire carcass into a unitary assembly.

It is an object of this invention to provide a method and arrangement whereby previously cured elastomeric tread material may readily be bonded to a previously cured, solid elastomeric tire body. In accordance with this object of the present invention, the difficulties and deficiencies of retaining a tire body and tread material in assembled relation during curing to effect bonding are overcome by the use of sealing discs which engage sidewall portions of a solid elastomeric tire body and which sealingly receive portions of an envelope which encircles an assembled tire body and tread material.

Yet a further object of this invention is to adhere the previously cured tread material to a previously cured, solid elastomeric tire body in accordance with a method wherein the tire body and a wheel on which the tire body is permanently mounted are interposed between a pair of sealing discs which sealingly engage the tire body and an encircling envelope in such a way as to permit relative evacuation of the space within the assembly. With such relative evacuation, the pressure differential across the envelope presses the envelope against the previously cured tread material in such manner as to retain the tread material and tire body in assembled relation. The accommodation of such a fluid pressure differential across the envelope occurs even in the presence of a wheel assembly to which the tire body is permanently mounted.

Yet a further object of this invention is the provision of a sealing disc arrangement configured to sealingly engage a sidewall portion of a permanently mounted, previously cured, solid elastomeric tire body outwardly of the wheel to which the tire body is mounted. Through the use of an assembly in accordance with this invention, the desired retention of assembled relation of the tire body and the tread material occurs irrespective of the presence or absence of the wheel assembly.

Some of the objects and advantages of the invention having been stated, others will appear as the description proceeds, when taken in connection with the accompanying drawings, in which—

FIG. 1 is an exploded perspective view of the elements of an assembly in accordance with the present invention;

FIG. 2 is a perspective view of the elements of FIG. 1, as assembled for practice of the present invention;

FIG. 3 is an enlarged elevation view, in section, through the assembly of FIG. 2; and FIG. 4 is an enlarged elevation view, partially in section, of a portion of the assembly FIGS. 2 and 3.

While the description which follows will be particularly directed to the best mode presently known for the practice of this invention, as disclosed in the accompanying drawing, it is anticipated that the specific details of the method and apparatus of this invention may be varied within a broad scope of equivalents to which the invention is properly entitled. For that reason, the description which follows is to be read broadly rather than restrictively.

As mentioned briefly hereinabove, this invention is particularly directed to methods and apparatus for use with a permanently mounted, previously cured, solid elastomeric tire body such as the tire body generally indicated at 10 in the drawing. The tire body 10 represents a tire carcass originally intended for use as a pneumatic tire. The tire carcass has been assembled with a mounting wheel generally indicated at 11 and has an internal cavity therewithin filled with a foamable elastomeric material 12. Upon curing of the foamable elastomeric material 12, the tire body 10 and wheel 11 are bonded into a unitary assembly, resulting in the tire body becoming permanently mounted. Technology for accomplishing such filling of a tire carcass originally intended for use as a pneumatic tire is the subject matter of patent protection separately of this invention, and forms no direct part of this invention. As used herein, the term "solid tire body" refers both to tire bodies such as the body 10 specifically illustrated and to more conventional solid tire bodies in which the entirety of the tire body is formed of the same elastomeric material and the tire has never been intended for use as a pneumatic tire.

In a manner similar to prior disclosures, the tire body 10 is prepared for renewal by buffing of a tread face thereof to remove the remainder of a worn previous tread configuration. Thereafter, an elongate strip of previously cured elastomeric tread material 14 is prepared by placement of a thin layer of uncured elastomeric material thereon and is positioned encircling the buffed tread face. As assembled, the tread material 14 encircles a bonding layer of uncured rubber, which in turn encircles the buffed tread face of the tire body 10. To the extent that such methods are known from prior disclosures, they are not within the scope of the present invention and will not be disclosed in specific detail. Instead, reference is to be had to known disclosures of such techniques.

In accordance with important features of this invention, the tire body 10 is interposed between a pair of sealing discs 15, 16 each defining a radially opening groove and each having a circular sealing lip engaging a corresponding sidewall portion of the tire body 10. In describing the particular configuration of the sealing discs 15, 16 reference will be had first to a description of a sealing disc 15, which will be noted as including a main planar portion 18, a right circular cylindrical portion 19 and an annular lip portion 20. Mounted on the cylindrical portion 19 is an angle member 21, disposed to define an annular groove which opens radially outwardly for purposes to be described more fully hereinafter. The sealing disc 16 is constructed in a generally similar manner with a central portion 22, cylindrical portion 24, lip portion 25 and angle member 26. Distinctions between the discs lie in the attachment, to the first disc 15, of an elongate locking member 28 and the formation, in the second disc 16, of a centrally disposed opening 29, for purposes to be made more clear hereinafter.

As the tire body 10 is interposed between the discs 15, 16, the elongate locking member 28 penetrates through a central opening in the wheel 11. By such penetration, the disc 15 is assured to be located as least generally concentric with the tire body 10. The opening 29 in the second disc 16 is also penetrated by the locking member 28, to assure coaxial mounting of the two discs. A sealing and spacing member 30 is then disposed on the locking member 28 and a clamping means, preferably in the form of a nut 31, is engaged with the locking member 28 to urge the discs 15, 16 one toward another for sealing engagement with the tire body 10. As indicated in FIG. 3, such sealing engagement occurs with the lip portions 20, 25 being drawn into tight engagement with sidewall portions of the tire body 10.

In order to assure that subsequent evacuation of the volume within the discs 15, 16 will properly occur, provision is made in the second disc 16 for the inclusion of a sealing ring 32. The sealing ring 32( FIG. 4) fits closely about the locking member 28 and is pressed into a sealing engagement therewith by the spacer member 30. With such sealing, fluid flow from a location outside the sealed discs 15, 16 into the volume defined therebetween is precluded.

The assembled tire body 10 and tread material 14 are encircled by a flexible fluid impervious envelope 34 which, in similarity to previously disclosed processes, will assure retention of the tread material 14 and tire body 10 in assembled relation during curing of the uncured material interposed therebetween. The envelope 34 is arrangd to extend outside the sealing discs 15, 16 (FIGS. 2 and 3) and is sealed to the discs 15, 16 by exertion thereon of a radially directed force. In particular, spring clamps 35, 36 are disposed in the radially opening grooves defined by the angle members 21, 26 to exert radially inwardly directed forces pressing portions of the envelope into the grooves. After such completion of an assembly in accordance with this invention, operative communication between the space closed within the discs 15, 16 and the envelope 34 and an area of reduced pressure may be established through a suitable valve means 38 formed in the envelope 34, elevated pressure may be applied to the exterior of the envelope 34 to press the same into close engagement with the tread material 14 and tire body 10 and curing may proceed.

In the drawing and specification, there has been set forth a preferred embodiment of the invention and although specific terms are employed, they are used in a generic and descriptive sense only and not for purposes of limitation.

That which is claimed is:

1. A method of bonding previously cured elastomeric tread material to a previously cured elastomeric tire body which is particularly adapted for solid tires permanently mounted on wheels, the method comprising the steps of buffing the tread face of the previously cured tire body, encircling the buffed tread face with a bonding layer of uncured rubber, encircling the uncured rubber with a previously cured tread material, interposing the tire body between a pair of sealing discs each having a circular sealing lip, sealingly engaging the side walls of the tire bod with the lips of the discs, encircling the tire body and tread material with a flexible fluid impervious envelope which extends outside the sealing discs, sealingly engaging said lips of said discs with said envelope by exerting radially directed forces on portions of the envelope and pressing the envelope portions into engagement with said discs, and then adhering the tread material to the tire body by curing the interposed rubber while retaining the tread material and tire body in assembled relation with the envelope.

2. A method according to Claim 1 wherein the interposing of the tire body between the pair of discs comprises positioning first and second discs against respective sidewall portions of the tire body and urging the discs one toward another for sealing engagement with the tire body.

3. A method according to Claim 2 wherein the urging of the discs one toward the other comprises penetrating the second disc with an elongate locking member extending from the first disc centrally through the tire body and engaging the locking member outwardly of the second disc.

4. A method according to Claim 3 further comprising sealing the penetration of the locking member through the second disc for ensuring retention of a pressure differential across the envelope.

5. A method according to Claim 1 further comprising locating the discs relative to the tire body by passing an elongate member extending from one disc through a central mounting opening in a wheel carrying the tire body.

6. In an arrangement for bonding to the tread face of a previously cured, solid elastomeric tire body which is permanently mounted on a wheel a strip of previously cured elastomeric tread material assembled to encircle the tire body, an assembly comprising envelope means for encircling the assembled tire body and tread material, first and second sealing disc means each having a circular sealing lip with an inner surface for sealingly engaging a side wall portion of the tire body and an outer surface for being sealingly engaged by said envelope, means for urging said sealing disc means one toward the other and said sealing lips thereof into sealing engagement with the side wall portions of a tire body interposed therebetween, and means for exerting on portions of said envelope means which extend over said disc means radially directed forces pressing said envelope portions into engagement with said disc means, so that the assembly is adapted to accommodate a fluid pressure differential across said envelope means which retains the tire body and tread material in assembled relation during curing thereof to effect bonding.

7. An assembly according to Claim 6 wherein said means for urging said discs together comprises an elongate locking member extending from one of said discs for penetrating the other of said discs and clamping means for engaging said locking member outwardly of said other disc.

8. An assembly according to Claim 7 further comprising sealing means disposed at said other disc for sealing engagement with said locking member so as to ensure retention of a pressure differential across said envelope.

9. An assembly according to Claim 6 wherein said circular sealing lip of each of said disc means includes an annular portion defining a planar surface of predetermined radial height for engaging an annular area of a sidewall portion of the tire body.

10. An assembly according to Claim 9 wherein each of said disc means comprises a central planar portion parallel to and spaced from said sealing lip, a cylindrical portion joining said sealing lip to said central portion, and means defining a radially opening groove encircling said cylindrical portion for receiving said envelope portion upon which radially directed forces are exerted.

11. A sealing disc means adapted for use in an arrangement for bonding to the tread face of a permanently mounted, previously cured, solid elastomeric tire body, a strip of previously cured elastomeric tread material assembled to encircle the tire body, the disc means comprising a planar central portion, a sealing lip defining a planar annular surface of predetermined radial height parallel to and spaced axially from said central portion, a cylindrical portion joining said central portion and said lip, and means encircling said cylindrical portion for defining a radially opening groove.

References Cited

UNITED STATES PATENTS

| | | | |
|---|---|---|---|
| 3,207,647 | 9/1965 | Schelkmann | 156—394 FM |
| 3,752,726 | 10/1973 | Barefoot | 156—394 FM |
| 3,779,832 | 12/1973 | Reppel | 156—394 FM |
| 3,793,116 | 2/1974 | Schelkmann | 156—394 FM |
| 3,802,977 | 4/1974 | Waska | 156—394 FM |
| 3,689,337 | 9/1972 | Schelkmann | 156—128 R |
| 2,014,010 | 9/1935 | Wheatley | 156—394 FM |
| 2,468,121 | 4/1949 | Shell | 156—394 FM |
| 3,676,028 | 7/1972 | Christie et al. | 156—394 FM |
| 3,729,358 | 4/1973 | Barefoot | 156—128 R |
| 3,745,084 | 7/1973 | Schelkmann | 156—96 R |

FOREIGN PATENTS

| | | | |
|---|---|---|---|
| 555,727 | 9/1943 | Great Britain | 156—96 |

CLIFTON B. COSBY, Primary Examiner

U.S. Cl. X.R.

156—113, 128, 129, 394 FM